(12) United States Patent
Kreh

(10) Patent No.: US 7,179,025 B2
(45) Date of Patent: Feb. 20, 2007

(54) MACHINE AND METHOD WITH 7 AXES FOR CNC-CONTROLLED MACHINING, PARTICULARLY GENERATING CUTTING OR GRINDING; OF SPIRAL BEVEL GEARS

(75) Inventor: Wilhelm Kreh, Radevormwald (DE)

(73) Assignee: Klingelnberg GmbH, Huckeswagen (DE)

( * ) Notice: Subject to any disclaimer, the term of this patent is extended or adjusted under 35 U.S.C. 154(b) by 391 days.

(21) Appl. No.: 10/722,705

(22) Filed: Nov. 25, 2003

(65) Prior Publication Data

US 2004/0105731 A1 Jun. 3, 2004

(30) Foreign Application Priority Data

Dec. 2, 2002 (DE) .............................. 102 56 222

(51) Int. Cl.
*B23F 9/10* (2006.01)
(52) U.S. Cl. .................... 409/26; 409/27; 409/30; 451/47; 451/219
(58) Field of Classification Search ............... 409/25, 409/26, 27, 28, 29, 30, 38, 39; 451/47, 147, 451/219, 253; *B23F 9/10, 9/02, 9/12, 9/14*
See application file for complete search history.

(56) References Cited

U.S. PATENT DOCUMENTS

| | | | | |
|---|---|---|---|---|
| 3,212,403 A | * | 10/1965 | Meyrick ................. | 409/27 |
| 3,464,312 A | * | 9/1969 | Hanzawa et al. ........ | 409/29 |
| 3,492,915 A | * | 2/1970 | Denisov et al. ......... | 409/30 |
| 4,514,118 A | * | 4/1985 | Kotthaus ................. | 409/26 |
| 4,930,950 A | * | 6/1990 | Stadtfeld ................. | 409/27 |

FOREIGN PATENT DOCUMENTS

| | | |
|---|---|---|
| DE | 255 296 A1 | 2/1988 |
| DE | 196 46 189 C2 | 8/1999 |

(Continued)

OTHER PUBLICATIONS

M.G. Segal, "Ways of Numerical Program Control Utilization in Machine Tools for Machining Round Teeth of Conical and Hypoid Transmissions", (Izvestiya vuzov. Mashinostroenie, 1985, Nr. 6, S. 120-124.

*Primary Examiner*—Daniel W. Howell
(74) *Attorney, Agent, or Firm*—McCormick, Paulding & Huber LLP

(57) ABSTRACT

On a CNC machine for machining spiral bevel gears the axis (T) of a tool spindle forms a fixed, non-adjustable tilt angle (κ) against an orientation axis (O) for all bevel gears to be machined. The tool spindle is adapted to be continuously swiveled about the orientation axis (O) by a swivel drum. A work gear spindle is adjustable in its angular position about a pivot axis (P) for a bevel gear to be machined on the machine, but it does not change its angular position during the machining operation. The tilt angle (κ) and the angular position are selected such that a predetermined rolling motion between the work gear and the tool can be achieved. Swiveling of the tool spindle axis (T) about the orientation axis (O) leads to a higher machine stiffness than does a machine root angle pivoting of the work gear spindle axis (W) about the pivot axis (P) applied in the prior art, and therefore, it results in more precise tooth flanks on the machined spiral bevel gears.

25 Claims, 9 Drawing Sheets

FOREIGN PATENT DOCUMENTS

| | | |
|---|---|---|
| DE | 19829880 A1 * | 8/1999 |
| EP | 0 374 139 B1 | 1/1997 |
| EP | 0 784 525 B1 | 7/1997 |
| JP | 02237718 A * | 9/1990 |
| JP | 04343613 A * | 11/1992 |
| JP | 11262816 A * | 9/1999 |
| SU | A-946 830 | 7/1982 |
| WO | WO 02/066193 A1 | 8/2002 |

* cited by examiner

MACHINE AND METHOD WITH 7 AXES FOR CNC-CONTROLLED MACHINING, PARTICULARLY GENERATING CUTTING OR GRINDING; OF SPIRAL BEVEL GEARS

CROSS-REFERENCE TO RELATED APPLICATIONS

This application is entitled to the benefit of and incorporates by reference essential subject matter disclosed in German Patent Application No. 10256222.9 filed on Dec. 2, 2002.

FIELD OF THE INVENTION

This invention relates to a machine and a method for machining spiral bevel gears with and without hypoid offset in accordance with claims 1 and 22, respectively.

BACKGROUND OF THE INVENTION

According to the fundamental invention of Segal (SU-A-946830 and M. G. Segal: "Ways of Numerical Program Control Utilization in Machine Tools for Machining Round Teeth of Conical and Hypoid Transmissions," Izvestiya vuzov, Mashinostroenie, 1985, No. 6, pp. 120–124), a conventional mechanical generating machine for the production of spiral bevel gears, having a tiltable cutter head on a cradle and up to ten axes, of which a maximum of three axes rotate dependent on one another during the generating cutting operation, can be replaced with a numerically controlled generating machine with six axes at the most, all of which work simultaneously and in accordance with non-linear principles, to produce the same bevel gears as on the conventional machine.

Since then, a series of CNC-controlled bevel gear machines representing different embodiments of the principle introduced by Segal have been made public, for example a multi-axis bevel and hypoid gear generating machine according to EP-B1-0 374 139. What all CNC-controlled machines with 6 axes have in common is that a work gear spindle support has to be continuously repivoted about a vertical axis during the generating motion. This is referred to as machine root angle pivoting. This machine root angle pivoting is necessary because the cutter head, which on a conventional mechanical generating machine moves on a curved cone surface in the case of a conical generating gear, is moved by a cross slide in one plane on a numerically controlled generating machine. However, in a machine according to WO 02/066193 A1, the tool spindle and the work gear spindle have been interchanged, so that there the tool spindle support has to be repivoted. This, however, does not alter anything in the principle set forth by the fundamental invention of Segal.

The machine root angle pivoting of the work gear spindle support generally reverses its direction within one generating cutting operation. On the one hand, this entails a control problem, particularly in the single indexing method (face milling), in which the machine root angle pivoting takes place at a greater speed than in the continuous indexing method (face hobbing). On the other hand, this entails a load reversal in those mechanical elements which effect the movement of the pivotable work gear spindle support. Even if there is no backlash in the drive train for the machine root angle pivoting, because only pre-stressed bearings, joints and rotary spindles are used, these are elastic machine elements which alter their deformation in a load reversal and thereby cause inaccuracies in the bevel gear tooth surfaces produced. The greater the radius of action of the pivotable spindle support, the more critical this effect becomes, since small errors are then magnified due to the motion reversal. The required pivotability of the work gear spindle carrier during machining impairs its stiffness. However, for the production of bevel gears with precisely specified tooth flanks the greatest stiffness is actually imperative.

DD-A1-255296 discloses a gear-cutting machine for the production of bevel gears in generating and profile grinding methods, in which the work gear spindle support can be pivoted about a vertical axis and the work gear and tool spindle supports are vertically and horizontally displaceable relative to one another. The purpose of this is to substantially reduce the expenditure for the gear-cutting machine and its drive and control technology and to increase its degree of automation. This known machine with 8 axes essentially differs from a mechanical cradle machine only in that the cradle, on which an adjustable swivel drum with the tool is eccentrically mounted, is replaced with a cross slide by means of which the swivel drum bearing the tool can be displaced in two coordinates arranged at right angles to one another. The tool axis forms an adjustable tilt angle with the swivel drum axis. On a classic cradle machine the orientation of the tilt angle is fixed by an additional angle (swivel). As opposed to this, in a cross-slide machine the orientation of the tool inclination must additionally be slaved to the original cradle rotation by continuously rotating the swivel drum. For each type of bevel gear to be produced the tilt angle has to be set anew on the known machine. For this purpose, a tool tilting mechanism known from classic cradle machines is arranged between the swivel drum and the tool. During machining a bevel gear series, this tilting mechanism is clamped tight and the orientation taken into account with the initial position of the swivel drum rotation remaining unchanged. Whenever a different bevel gear is to be produced, a different tilt angle between the tool axis and the swivel drum axis must be adjusted with the aid of the tilt mechanism, and a different initial position of the swivel drum must be provided with the aid of the control. A further adjustment relates to the work gear spindle support. The machine root angle, to which the work gear spindle support is pivoted and which remains fixed during machining, is the work gear setting angle $\delta_E$. In the generating method this angle depends on the pitch angle of the bevel gear to be produced. In the profile grinding method the gear setting angle $\delta_E$ depends primarily on the shaft angle of the bevel or hypoid gearing. The machine root angle as well is set anew in every new type of bevel gear to be produced. The rolling operation then runs as on the classic mechanical cradle machine. The only difference is that to move the tool the swivel drum is not pivoted by the cradle around the cradle axis, but rather by a separate rotary drive.

A multi-axis generating machine with CNC control for the production of bevel and hypoid gears is known from EP-B1-0 374 139 already mentioned above. In this known machine the tool spindle is moved in a vertical plane by a cross slide. Here, the axis of the tool spindle remains constantly horizontal. At the same time, during the generating cutting the work gear spindle has to be pivoted about a vertical pivot axis. This known machine is a so-called 6-axis machine. The six axes include three translationally movable axes and three rotational axes. One of the three rotational axes is the vertical pivot axis. All six axes are controlled simultaneously during generating cutting. The pivoting movement of the work gear axis about the vertical pivot axis generally has a reversal point. This means that the pivoting movement slows down as it approaches a maximum machine root angle, then reverses its direction and speeds up again. As already explained above, a pivoting movement of this nature entails control problems, since the movement must be braked and then accelerated again in the opposite direction. The load reversal also already mentioned above, which causes the form changes in the drive train of the pivoting mechanism, can result in undesired deviations on the flanks of the bevel gears produced.

In the machine known from the above-mentioned DD-A1-255296, the tilting mechanism, which has to be set a new for every new type of bevel gear to be machined, causes precision problems. Furthermore, providing the tilting mechanism on a swivel drum is very complicated. To be sure, the machine according to EP-B1-0 374 139 does not have this disadvantage. However, it does have the disadvantage described above, which results from the necessary pivoting movement of the work gear spindle about the vertical pivot axis.

It is the object of the invention to design a machine and a method for CNC-controlled machining, particularly generating cutting or generating grinding, of spiral bevel gears with and without hypoid offset, in such a manner that no adjustable tilting mechanism is required for the tool axis, but nevertheless, no machine root angle pivoting of one of the spindle supports is required either.

This object is achieved in accordance with the invention in the machine and the method, with the features and steps given in claims 1 and 22, respectively.

SUMMARY OF THE INVENTION

According to the invention, instead of a swiveling tilting mechanism, it is provided that a first spindle of the work gear spindle and the tool spindle forms for all bevel gears to be machined on the machine a fixed, non-adjustable tilt angle against an orientation axis and that the first spindle is adapted to be continuously swiveled about the orientation axis by a rotatable swivel device. Thus, according to the invention, the set tilt angle remains the same regardless of what tilt the bevel gear to be machined requires. This is because this tilt angle is determined from the start in the machine design, and it then remains constant, namely for all possible bevel gears. Furthermore, the second spindle of the work gear spindle and the tool spindle, forming a reference plane with its axis and the orientation axis, is, for a bevel gear to be machined on the machine, adjustable in its angular position about a pivot axis which latter is perpendicular to the reference plane, but the second spindle does not change its angular position during the machining operation. Therefore, in the machine according to the invention, it is possible to clamp the pivotable spindle support on a large base during a machining operation and thereby to further increase the machine stiffness. All tooth flank inaccuracies and difficulties which can arise in state-of-the-art bevel gear production through the presence of the tilting mechanism or through the drive train of the pivoting mechanism of the work gear spindle support, are thus avoided by the invention. Furthermore, according to the invention, one axis is spared on the swivel device, namely the adjustment axis for the tilt. In this manner, the design of the swivel device is also greatly simplified.

The type of machining that can be performed with the machine and the method according to the invention is particularly generating cutting or generating grinding.

In one embodiment of the invention, the swivel device has a swivel drum capable of rotation about the orientation axis, with the swiveling spindle being rotatably mounted on or in said drum. In this case, to achieve the predetermined relative rolling motion the direction of the inclined tool axis can be continuously corrected with great accuracy and without problems by rotating the swivel drum.

In another embodiment of the invention, means are provided for rotating, particularly non-linearly rotating the swivel drum. In this case, the predetermined relative rolling motion can be achieved, even though the fixed, non-adjustable tilt angle in the machine according to the invention ordinarily does not coincide with the required tilt of the bevel gear to be produced.

In further embodiment of the machine according to the invention, one of the three directions in which the work gear spindle and the tool spindle are relatively movable is inclined.

In a further embodiment of the machine according to the invention, the tilt angle is at least equal to the maximum value of all maximum machine root angle pivoting ranges occurring during machining of bevel gears on a conventional 6-axis machine. In this case, the swivel motion of the swiveling spindle around the orientation axis is sufficient in any event to produce the necessary relative movements between the tool and the work gear, which are required for achieving the predetermined relative rolling motion.

In a further embodiment of the machine according to the invention, the angular position of the second spindle is measured against a coordinate axis which latter is in the reference plane and is perpendicular to the orientation axis, said angular position being designated as the machine root angle. In this case, the maximum root angle pivoting range for all bevel gears to be machined can be found easily.

In a further embodiment of the machine according to the invention, a machine root angle which is to be adjusted, corresponds to an angle equal to the maximum machine root angle resulting from a bevel gear to be machined on a conventional 6-axis machine, minus the tilt angle. In this case a motion reversal in the swivel motion of the swiveling spindle about the orientation axis is certainly avoided.

In a further embodiment of the machine according to the invention, the tilt angle lies within a range of greater than 0° and up to 35°, and preferably from 5° to 15°, and is preferably 10°. In this case, all bevel gears that can be machined on a conventional 6-axis machine can be machined on the machine according to the invention.

In a further embodiment of the invention, the first spindle of the work gear spindle and the tool spindle is rotatably mounted in a first spindle support which is capable of being pivoted about the pivot axis, which pivot axis is perpendicular to the reference plane, and which first spindle support is displaceable in one of the three directions, and the second spindle—together with the swivel drum in which it is rotatably mounted—is rotatably mounted in a second spindle support which is displaceable in one of the other two directions, said second spindle being displaceably guided in the third direction.

In a further embodiment of the invention, both spindle supports are guided horizontally. In this case, the spindle support design can easily be optimized along the lines of maximum process stiffness.

In a further embodiment of the machine according to the invention, the first spindle support is guided horizontally and the second spindle support is guided with respect to height.

In a further embodiment of the machine according to the invention, the second spindle support has a first carriage guided horizontally and a second carriage which is guided on said first carriage with respect to height and on which the swivel drum is rotatably mounted. In this case, the second spindle support, can be supported by a broad foot, for example on a horizontal machine base. This can further increase the process stiffness.

In a further embodiment of the machine according to the invention, the second spindle support has a first carriage guided with respect to height and a second carriage which is horizontally guided on said first carriage and on which the swivel drum is rotatably mounted. This offers the possibility of displaceably mounting at least the second spindle support on an inclined or a vertical base.

In a further embodiment of the machine according to the invention, the horizontal guides are each provided on a horizontal base.

If on the other hand, in a further embodiment of the machine according to the invention, the horizontal guidance of the first spindle support and the guidance in height of the second spindle support are provided on an inclined or a vertical machine base.

In a further embodiment of the machine according to the invention, the work gear spindle and the tool spindle are arranged in such a manner that during machining, the work gear and the tool engage at a location substantially above a region of the machine free of horizontal guides, and a chip collector into which chips will fall substantially by gravity, is or can be provided in said region. In this case, the machine is particularly suitable for so-called dry milling.

In a further embodiment of the machine according to the invention, the direction in which the swivel drum can be moved height-wise with its associated carriage is inclined against the vertical. In this case, the associated spindle support can be designed with a broader foot.

In a further embodiment of the machine according to the invention, the tool spindle is rotatably mounted in the swivel drum. In this case, the tool can be moved for a tool change into a more easily accessible position for the operator, by rotating the swivel drum accordingly by rotary means.

In a further embodiment of the machine according to the invention, a built-in spindle motor for the tool spindle is provided in the swivel drum. In this case, the drive of the tool spindle can be configured in an especially simple manner.

In a further embodiment of the machine according to the invention, a driving motor for the tool spindle is provided externally of the swivel drum and is connected to the tool spindle via an angular gear. In this case, the tool spindle can be especially short and compact.

In addition to the foregoing, the present invention also resides in a method for generating cutting or generating grinding spiral bevel gears with an without hypoid offset wherein a work gear is rotatably mounted on a work gear spindle. A tool is mounted on a tool spindle. The work gear spindle is moved relative to the tool spindle in up to three different directions. The angular position of the work gear spindle or the tool spindle is adjusted to form a reference plane with respect to either the work gear spindle axis or the tool spindle axis and an orientation axis. The reference plane is formed about a pivot axis, the pivot axis being perpendicular to the reference plane a bevel gear to be machined. The angular position mentioned above is maintained throughout the machining operation. The other of the work gear or tool spindles is swiveled about the orientation axis at a tilt angle relative thereto. The angular position and the tilt angle are selected so that a predetermined relative motion is achieved between the gear and the tool by the continuous swiveling. With this method, the machine root angle pivoting about a vertical pivot axis during milling on a 5-axis or 6-axis machine as required in the state of the art can be avoided by selection of one and the same fixed angle for all bevel gears to be machined, between an orientation axis and the inclined spindle axis, which can be pivoted around the orientation axis. This causes the orientation of the inclined spindle axis to change, while the other spindle is adjusted and remains at an optimal angle around the pivot axis which latter is perpendicular to a reference plane. To maintain the predetermined relative rolling movement, only the direction of the inclined spindle axis has to be continuously tracked. The advantages of this measure are that no motion reversal occurs in the orientation of the inclined spindle axis, and by this means the machine precision is further increased. This is because, in addition, the other spindle remains clamped tight during the machining, so that its spindle support is stiffer than a trackable work gear spindle support.

For practical purposes, the predetermined relative rolling motion between the tool and the work gear are calculated and controlled here by the computer, which is provided in or associated with the machine anyway. With the aid of the computer, the tool and the work gear are first caused to engage and then are kept continuously engaged during the predetermined relative rolling motion. The calculation of the optimum pivot angle about the pivot axis and the adjustment of this angle, as well as the continuous tracking of the inclined spindle axis are performed expediently with the aid of the aforementioned computer.

In one embodiment of the method according to the invention, the tilt angle selected is at least equal to the maximum value of all maximum machine root angle pivoting ranges occurring during machining of bevel gears on a conventional 6-axis machine. In this case, the swivel motion of the inclined spindle axis about the orientation axis can in any event be adequately dimensioned to produce the necessary relative movements between the tool and the work gear, which are required for achieving the predetermined relative rolling motion.

In another embodiment of the method according to the invention, an angle is calculated for the machine root angle to be adjusted that is equal to the maximum machine root angle resulting from a bevel gear to be machined on a conventional 6-axis machine, minus the tilt angle. In this case a motion reversal in the swivel motion of the inclined spindle axis about the orientation axis is certainly avoided.

In a further embodiment of the method according to the invention, to achieve the predetermined rolling motion the continuous swiveling of the other spindle is non-uniform. In this case, the same tooth flanks can be achieved as on a conventional 6-axis machine or on a classic cradle machine.

DETAILED DESCRIPTION OF THE PREFERRED EMBODIMENTS

Figure 1:
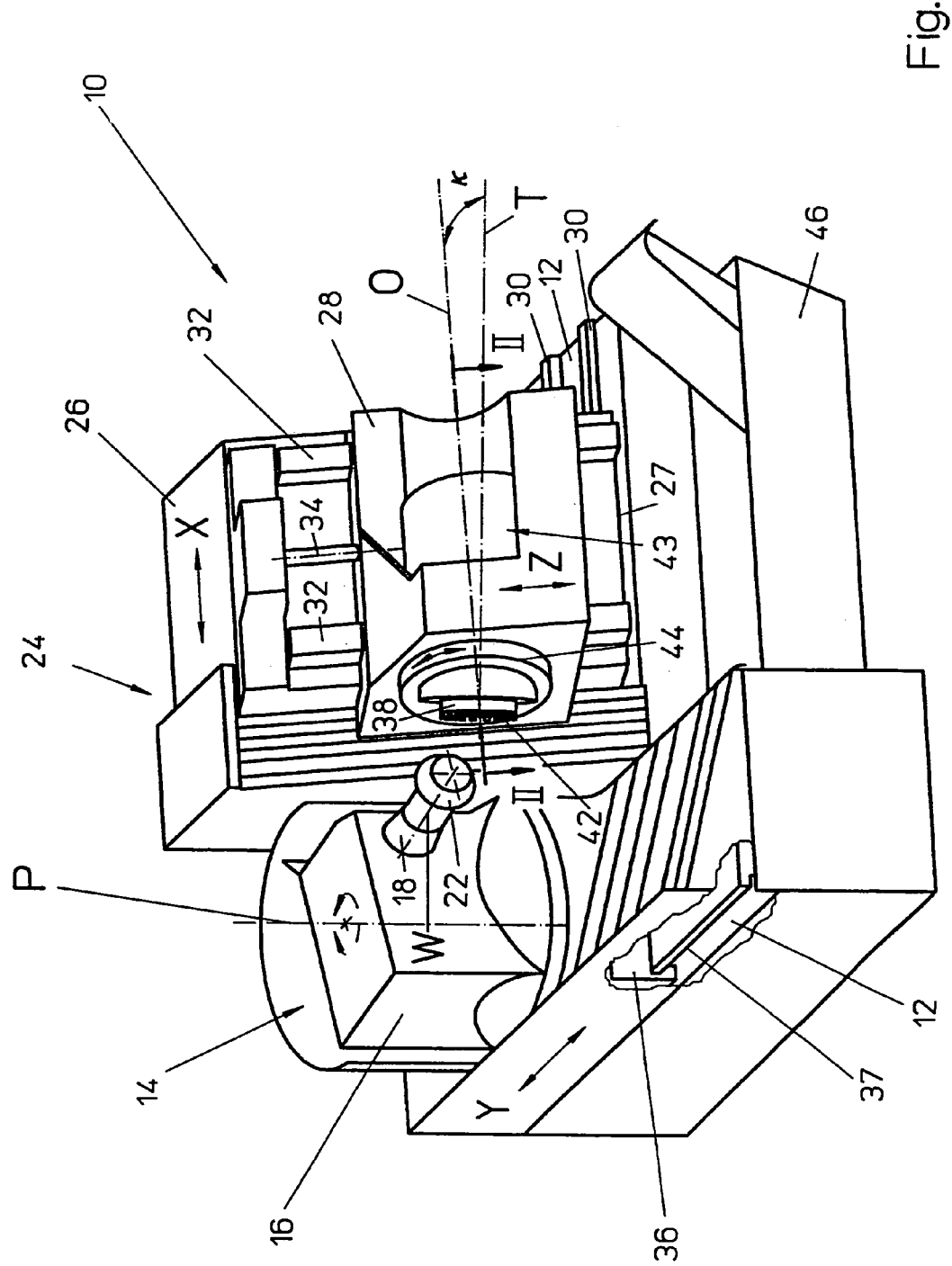
FIG. 1 shows a perspective view of the basic structure of an embodiment of a machine according to the invention, which is designed for CNC-controlled production of spiral bevel gears with and without hypoid offset by generating cutting.

FIG. 1 shows a perspective view, from the operator's side, of the basic structure of a first embodiment of a machine 10 according to the invention for CNC-controlled machining of spiral bevel gears with and without hypoid offset, provided here as a generating cutting machine. A first spindle support or work gear spindle support 14 is movable on a machine base 12 in the direction of a straight coordinate axis Y. The first spindle support 14 has a pivoting member 16 that can be pivoted about a vertical pivot axis P and that supports a work gear spindle 18 with a work gear spindle axis W for rotatably mounting a work gear 22, which in the present case is a pinion.

The pivot axis P is vertical only in the embodiment shown and described here. The machine 10 could also be designed so that the pivot axis P is horizontal, for example. In general, the pivot axis P is perpendicular to a reference plane, which will be described in greater detail in connection with FIGS. 8 to 10.

There is further a second spindle support or tool spindle support 24 mounted on the machine base 12. It is guided horizontally and linearly along a straight coordinate axis X, which is orthogonal to the coordinate axis Y. The second spindle support 24 has a first carriage 26 and a second carriage 28. The first carriage 26 has rolling shoes (not visible in FIG. 1), which engage with a horizontal guide 30 formed by guide rails. The second carriage 28 can be moved in height on the first carriage 26 on a guide 32 along a straight coordinate axis Z, by means of a spindle drive 34. The pivoting member 16 of the first spindle support 14 is located on a third carriage 36 that is linearly guided on a horizontal guide 37 along the coordinate axis Y. In the inclined-base machine shown in FIG. 1, the Z axis is inclined against the Y axis. Instead of this, it could also be orthogonal (not shown) to the Y axis. The second spindle support 24 bears a tool spindle 38 for rotatably mounting a tool 42, which in the present case is a cutter head. The tool spindle 38 is rotatably mounted in a swivel drum 44. The swivel drum 44 in turn is mounted in the second carriage 28 of the second spindle support 24 so as to be rotatable about an orientation axis O.

In the embodiments of the machine 10 according to the invention described above and below, the work gear spindle 18 is mounted so as to be pivoted about the vertical pivot axis P and displaced in the Y direction through the first spindle support 14. The tool spindle 38, with the swivel drum 44 in which it is rotatably mounted, is mounted for rotation through the second spindle support 24, which is displaceable in one of the other two directions, namely in the X direction, and the tool spindle is displaceably guided by its second carriage 28 in the third direction, namely in the Z direction. However, the arrangement could also be made in which not both spindle supports 14, 24 are horizontally guided, but rather in which the first spindle support 14 is movable with horizontal guiding, and the second spindle support 24 is movably guided in height with a first carriage. Furthermore, in this additional arrangement, which is not shown, the second spindle support 24 could have a second carriage which is guided horizontally on the first carriage and on which the swivel drum 44 is rotatably mounted. In this case, the machine base could be designed vertically as a column, as mentioned above. This additional arrangement is equivalent to the arrangement given in connection with the embodiments described here and, therefore, it does not need to be described in greater detail. In the further arrangement not shown here, the machine base could also be inclined against the horizontal instead of being vertical. In both the arrangement shown and in the one not shown, the work gear spindle 18 and the tool spindle 38 are arranged in such a manner that in the generating cutting operation the work gear 22 and the tool 42 engage at a point located substantially above a machine area that is free of horizontal guides, in which area a chip collector 46 is provided, into which the chips will fall substantially through gravity. This area free of horizontal guides in the embodiments shown is a recessed area of the machine base 12, which latter is L-shaped when viewed from above. This can be seen in FIG. 1.

In the embodiments shown, an axis T of the tool spindle 38 forms a fixed, non-adjustable tilt angle κ with an orientation axis O for all bevel gears to be machined on the machine 10. The tool spindle 38 can be continuously swiveled about the orientation axis O by a swivel device 43. As opposed to this, prior to the machining, the axis W of the work gear spindle 18 is set in its angular position around the vertical pivot axis P for a bevel gear to be machined on the machine 10. This is not changed during the machining. The selection of the tilt angle κ and of the fixed angular position is described in greater detail below with reference to FIGS. 7 to 10. The swivel device 43 has a swivel drum 44, which is rotatable about the orientation axis O and in which the tool spindle 38 is mounted so as to be rotatable about the tool spindle axis T.

Figure 2:
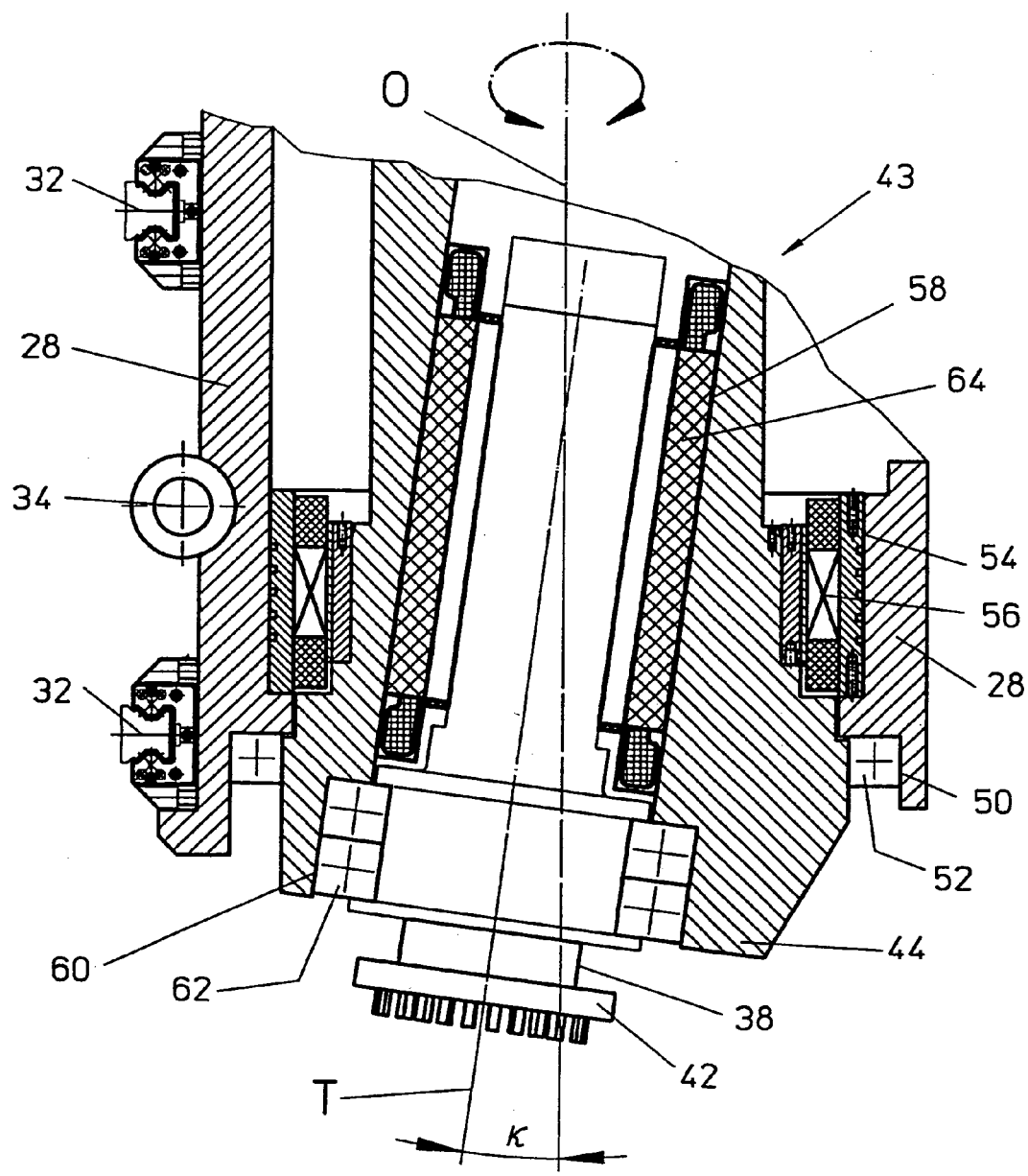
FIG. 2 shows as a detail in longitudinal section along line II—II of FIG. 1 a first embodiment of a swivel drum with a tool spindle rotatably mounted therein, which latter is provided with a built-in spindle motor.

FIG. 2 illustrates a first embodiment of the swivel device 43 in the section along line II—II in FIG. 1. The second carriage 28, which is movable in height by means of the spindle drive 34, can be recognized in FIG. 2. The swivel drum 44 with orientation axis O at right angles to the Y axis is rotatably mounted or rotatable in a bore 50 of the second carriage 28 by means of a roller bearing 52 and a sleeve shaft motor 56 provided in a bore 54. The sleeve shaft motor 56 for rotating the drum 44 is designed so that the drum is rotatable in a nonlinear or non-uniform manner. The swivel drum 44 contains a bore 58 arranged by the angle κ at a slant from the orientation axis O. The bore 58 has at its front end an enlarged bore part 60 in which the tool spindle 38 is rotatably mounted by roller bearings 62. A built-in spindle motor 64 is provided in the bore 58, by which the tool spindle 38 and thus the tool 42 can be caused to rotate about the tool spindle axis T. The built-in spindle motor 64 is an electric motor of which the rotor is part of the tool spindle 38.

Figure 3:
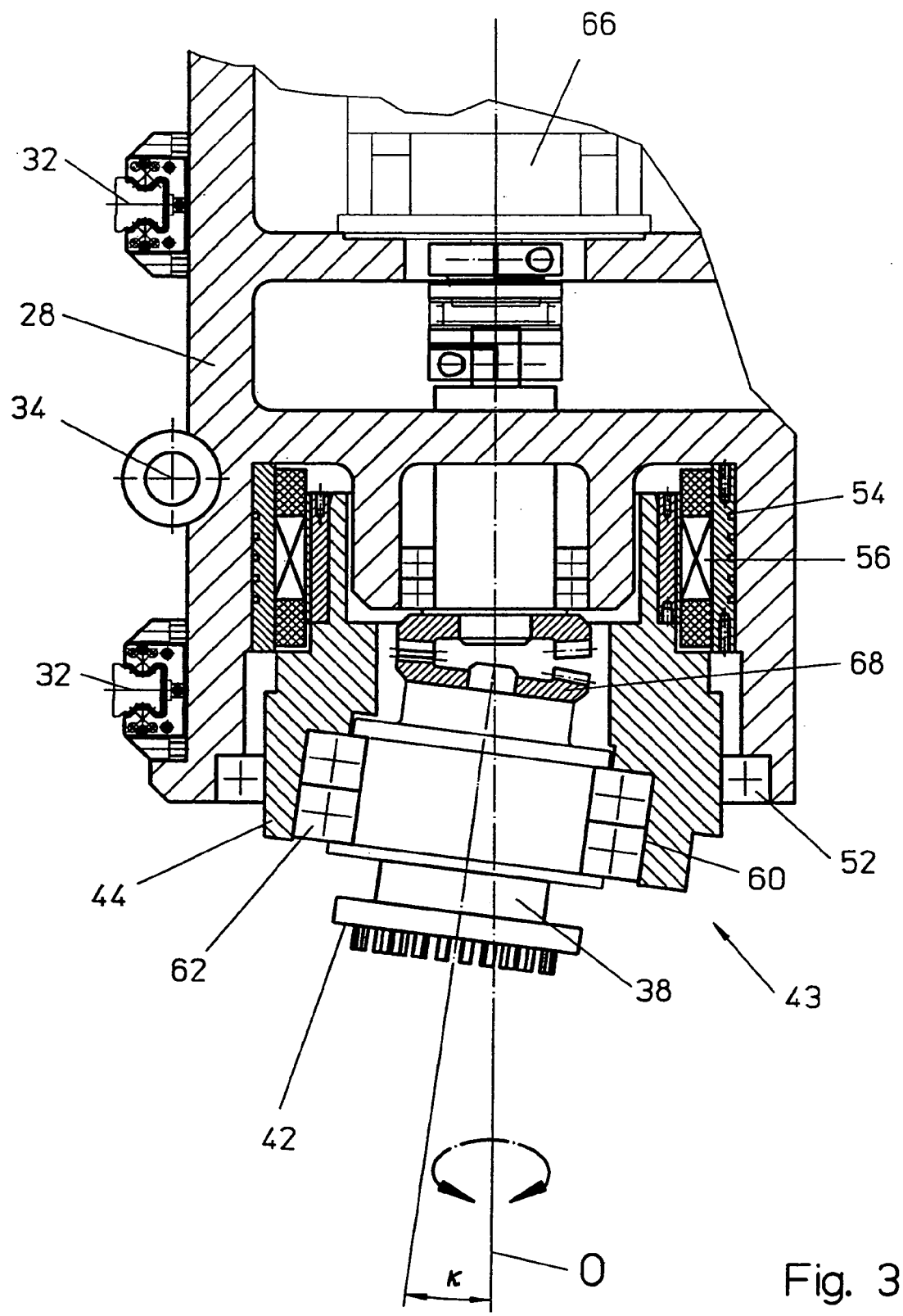
FIG. 3 shows as a detail in the same depiction as in FIG. 2, a second embodiment of a swivel drum with a tool spindle rotatably mounted therein, which latter is driven via an angular gear by a motor located externally of the swivel drum.

FIG. 3 shows a second embodiment of the swivel device 43, in which rotation can be imparted to the tool spindle 38 via an angular gear 68 by a driving motor 66 provided externally of the swivel drum 44. Aside from this, the same parts shown in FIG. 3 as in FIG. 2 are provided with the same reference numbers.

Figure 8:
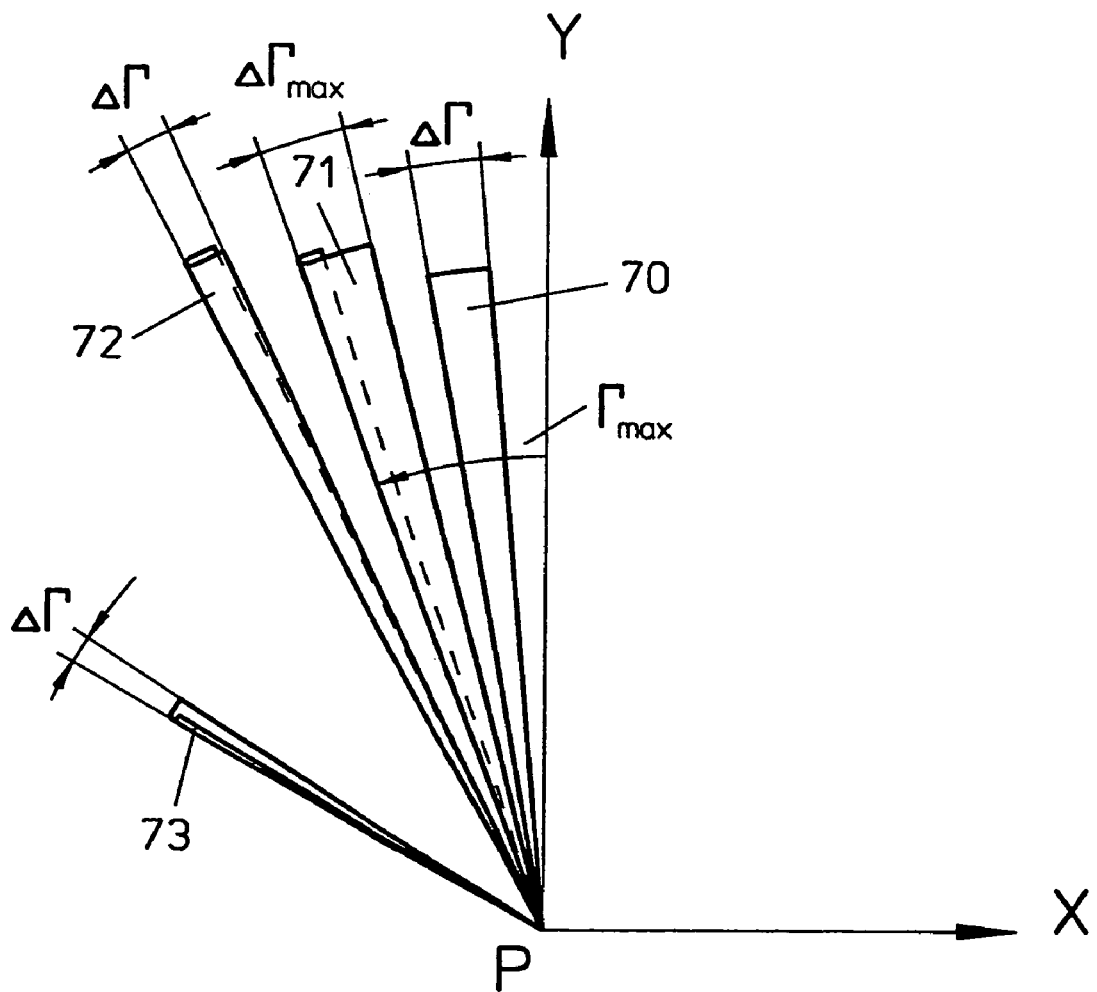
FIG. 8 shows, drawn into an orthogonal XYZ coordinate system of the machine according to FIG. 1, several machine root angle pivoting ranges for the work gear axis around a pivot axis P, which latter is perpendicular to a reference plane set up through the X and Y axes, for different types of bevel gears on a conventional 6-axis machine.
Figure 9:
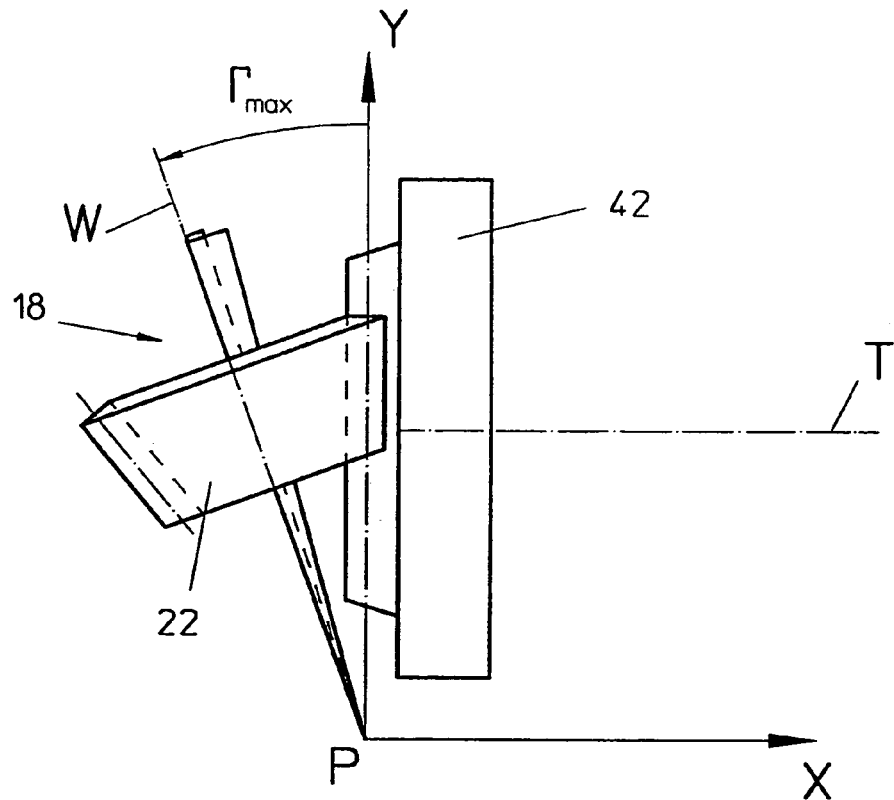
FIG. 9 shows a schematic drawing of a pinion in the same coordinate system as in FIG. 8, in which the pinion is in engagement with a cutter head as the tool and the pinion is in the process of being cut on a conventional 6-axis machine.
Figure 10:
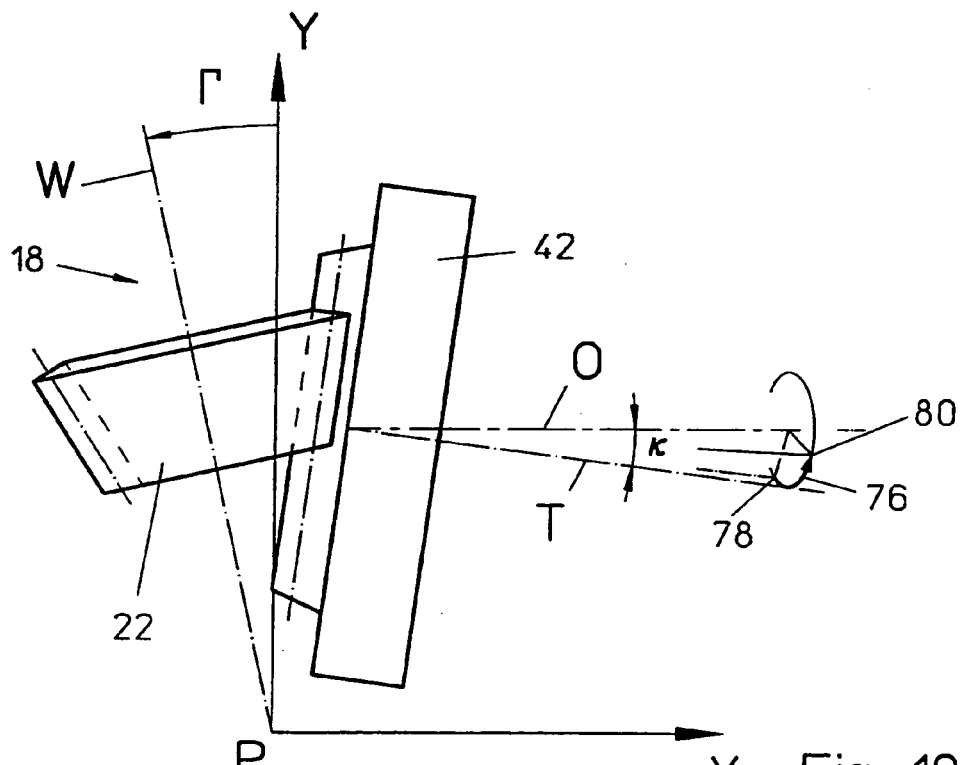
FIG. 10 shows the same work gear and the same cutter head as in FIG. 9, but on a machine according to the invention.

With reference to FIGS. 8–10, the selection of the tilt angle κ and of the adjustable fixed angular position of the work gear spindle 18 will now be described below.

Four machine root angle pivoting ranges 70, 71, 72, and 73, which occur on a conventional 6-axis machine during machining of four different bevel gears, are shown in FIG. 8. Each of the machine root angle pivoting ranges 70–73 has an angle width ΔΓ, which is given in each case between two arrowheads in FIG. 8. The machine root angle pivoting ranges 70–73 indicate how during generating cutting on a conventional 6-axis machine the work gear spindle axis W is moved around the pivot axis P to achieve a predetermined rolling motion between a work gear and a tool. In the machine root angle pivoting range, the work gear spindle axis W can only move in one direction, as for example in the machine root angle pivoting range 70. However, a motion reversal can also take place, such as in the machine root angle pivoting ranges 71, 72, and 73. The reversal point in the machine root angle pivoting area defines a maximum machine root angle $\Gamma_{max}$, measured against the Y axis. This is given for the machine root angle pivoting range 71 in FIG. 8. For the purposes of the invention, the broadest machine root angle pivoting range is selected from among the machine root angle pivoting ranges 70–73. In the embodiment shown in FIG. 8, this is the machine root angle pivoting range 71, which has the angle width $\Delta\Gamma_{max}$.

FIG. 9 shows the engagement between the work gear 22 and the tool 42 for a conventional 6-axis machine. The tool spindle axis T is parallel with the X axis and thus to the machine base, and it is at right angles to the Y axis. The tool spindle axis T maintains this position during generating cutting on the conventional 6-axis machine. For compensation, as described above, the work gear spindle axis W must be moved in a machine root angle pivoting range. Four examples of this for four bevel gears to be machined are shown in FIG. 8.

In the machine 10 according to the invention, the tilt angle κ selected is at least equal to the maximum value $\Delta\Gamma_{max}$ of all maximum machine root angle pivoting ranges occurring on a conventional 6-axis machine during machining of bevel gears. The maximum machine root angle $\Gamma_{max}$ is reduced by the angle κ on the machine 10. In other words, in FIG. 10 the work gear 22 and the tool 42, which are engaging, are pivoted to the right around the pivot axis P by the angle κ relative to the position in FIG. 9. Thus, on the machine according to the invention, the tool spindle axis T is no longer parallel with the X axis, but rather it is inclined by the angle κ, which is equal to the maximum machine root angle $\Delta\Gamma_{max}$. Therefore, the adjusted fixed angular position of the axis W of the work gear spindle 18, i.e. its machine root angle Γ, corresponds in FIG. 10 to an angle that equals the maximum machine root angle $\Gamma_{max}$ resulting for a bevel gear to be machined on a conventional 6-axis machine, minus the tilt angle κ. Thus, on the novel machine, according to FIG. 10 the axis T of the tool 42 is inclined by the angle κ against the orientation axis O, which is at right angles to the Y axis. Accordingly; the work gear spindle axis W lies closer by the angle κ to the Y axis, so that the work gear 22 and the tool 42 engage in FIG. 10 as they do in FIG. 9. In FIG. 10, the tilt angle κ can be seen in its actual size. As the generating operation progresses, the tool spindle axis T moves on a path suggested on the right in FIG. 10 as an ellipse. The pivoting range of the tool spindle axis T is shown by an arrow 76. The movement from a starting position up to a final position, which the arrow 76 indicates, approximately corresponds to the machine root angle pivoting of the work gear spindle axis W as applied in the conventional machine. However, according to FIG. 10, on the machine 10 according to the invention this process is a continuous turning of the tool spindle axis T about the orientation axis O from a point 78 up to a point 80. The ellipse, which is viewed from the left in FIG. 10, illustrates the range given by the arrow 76 between the points 78 and 80, in which the swivel drum 44 must rotate so that the predetermined relative rolling motion between the work gear 22 and the tool 42 can be achieved. In the meantime, the position of the work gear spindle axis W, which is set at the value $\Gamma_{max}$ minus κ, remains fixed. The work gear spindle axis W generally sets up a reference plane with the orientation axis O. The pivot axis P is perpendicular to the reference plane. The machine root angle Γ here is measured against the Y axis, which is at right angles to the orientation axis O in the reference plane. The tilt angle κ is measured against the orientation axis O. The tilt angle κ in the machine 10 lies within a range of greater than 0° and up to 35°, and preferably from 5° to 15°, and is preferably 10°. There is preferably no motion reversal in the movement of the tool spindle axis T around the orientation axis O. The generating gear axis (not shown), which performs a wobbling motion in space in the conventional multi-axis bevel gear generating cutting machine according to EP-B1-0 374 139, merely moves in a vertical plane in the machine according to the invention.

In carrying-out the CNC-controlled method according to the invention, the work gear spindle axis W and the tool spindle axis T are moved translationally in the three directions X, Y, and Z. In the embodiment described here, the work gear spindle axis W is adjusted in its angular position Γ about the vertical pivot axis P for a bevel gear to be machined on the machine, and this machine root angle Γ is maintained during generating cutting machining. Then, the tool spindle axis T is continuously swiveled about the orientation axis O with a fixed, non-adjustable tilt angle κ against the orientation axis O, for all bevel gears to be machined on the machine 10. In this connection, the machine root angle Γ and the tilt angle κ are selected so that a predetermined rolling motion can be achieved between the work gear 22 and the tool 42 by the continuous swiveling.

In the above method, just as in the machine 10 described above, the work gear spindle 18 and the tool spindle 38 can be interchanged. In other words, the work gear spindle 18 could be located on the second spindle support 24 and the tool spindle 38 could be located on the first spindle support 14. In addition, the horizontal guides of the spindle supports could be arranged on a vertical base instead of a horizontal one.

Furthermore, in the CNC generating cutting method according to the invention, the tilt angle κ is selected so as to be at least equal to the largest value of all maximum machine root angle pivoting ranges 71–73 which occur on a conventional 6-axis machine during machining of bevel gears. For the machine root angle Γ to be adjusted for the work gear spindle 18, an angle is calculated which is equal to the maximum machine root angle $Γ_{max}$ resulting for a bevel gear to be machined on a conventional 6-axis machine, minus the tilt angle κ.

Figure 4:
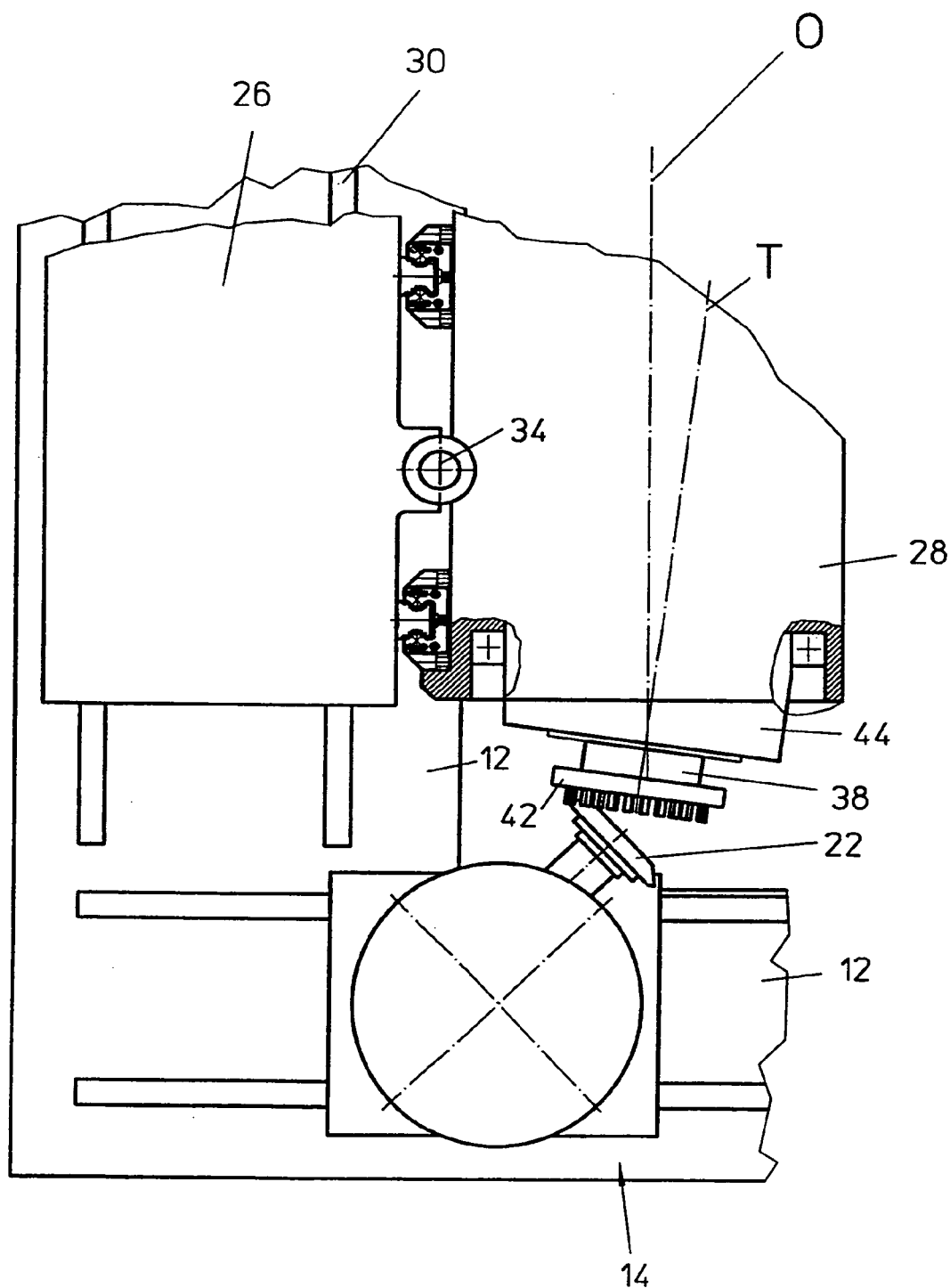
FIG. 4 shows a view from above of the working position of the machine, with the tool and the work gear engaging, during machining of a ring gear.

FIG. 4 shows an embodiment in which the work gear 22 being machined by the tool 42 is a ring gear.

Figure 5:
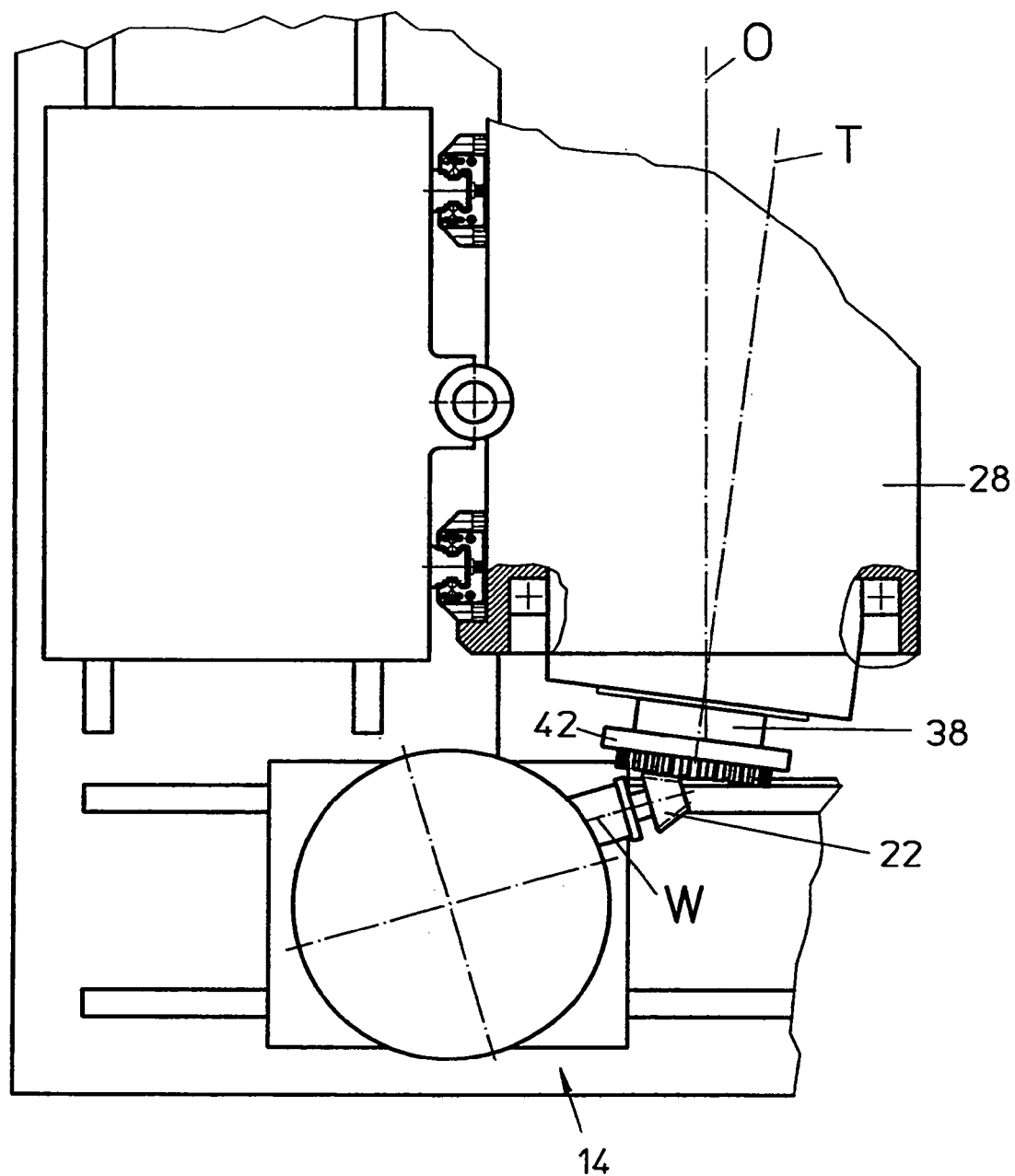
FIG. 5 shows a view from above of the working position of the machine, with the tool and the work gear engaging, during machining of a pinion.

FIG. 5 shows the same depiction as in FIG. 4 for the case of the work gear 22 being a pinion.

Figure 6:
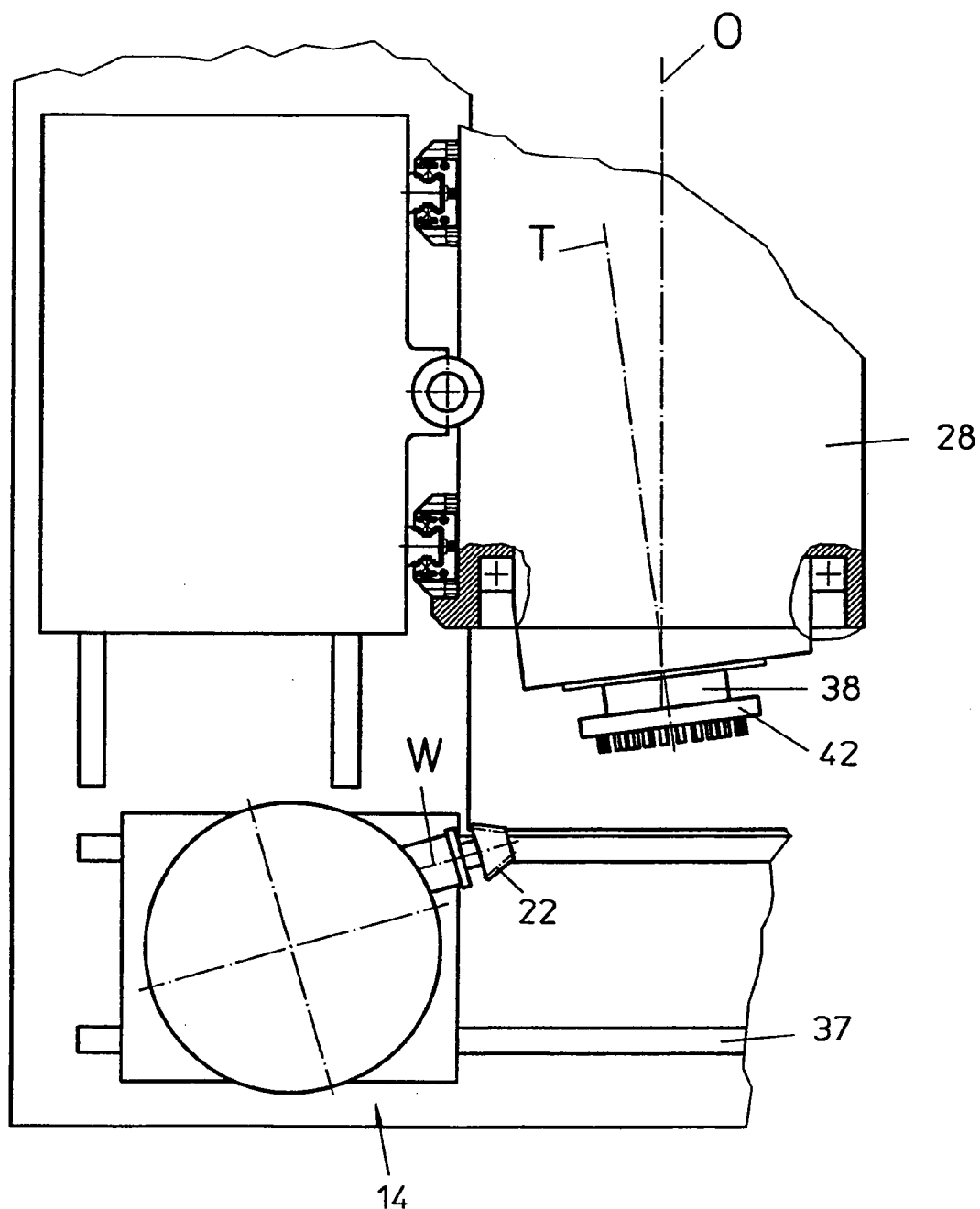
FIG. 6 shows a view from above of the machine position in which the machine can be loaded with a new work gear or blank to be machined and in which the tool can be changed.

In FIG. 6 the tool 42 is shown in a position for a tool change. To load the machine 10 with a new tool 22, the first spindle support 14 in FIG. 6 is further rotated until the work gear spindle axis W is parallel with the horizontal guide 37, and the carriage 36 is moved to the right.

Figure 7:
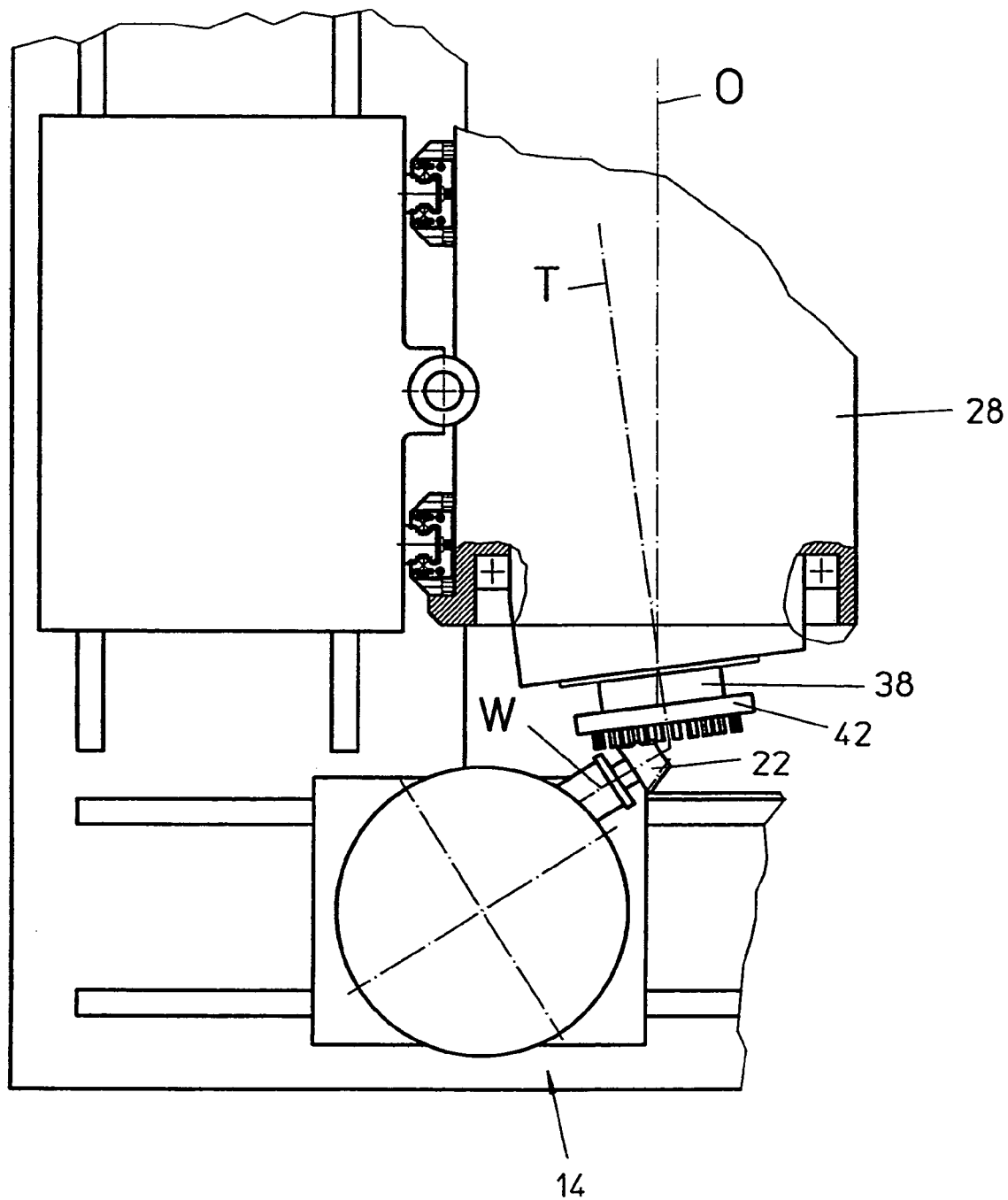
FIG. 7 shows a view from above of a working position of the machine, in which the tool and the work gear engage during machining of a pinion, but with the tool having been turned by 180° relative to the working position of FIG. 5, into the position according to FIG. 6.

FIG. 7 shows that under certain circumstances it is possible to machine a pinion even if the swivel drum 44 is in the position shown in FIG. 6. This machining position is to be preferred over that of FIG. 5, since in this case the point of engagement between the tool 42 and the work gear 22 is located directly above the chip collector 46 (FIG. 1).

What is claimed is:

1. A machine for CNC-controlled machining, of spiral bevel gears with and without hypoid offset, said machine comprising:
   a work gear spindle for rotatably mounting a work gear;
   a tool spindle for rotatably mounting a tool; and
   means for relative movement of the work gear spindle and the tool spindle in up to three different directions (X, Y, Z),
   wherein a first spindle of the work gear spindle and the tool spindle forms a tilt angle (K) against an orientation axis (O), wherein the tilt angle is non-adjustably fixed for all possible machining operations of said machine, and wherein the first spindle is adapted to be continuously swiveled about the orientation axis (o) by a rotatable swivel device, and the second spindle, forming a reference plane with its axis (W or T) and the orientation axis (O), is, for a bevel gear to be machined on the machine, adjustable in its angular position about a pivot axis (P) which pivot axis is perpendicular to the reference plane, but the second spindle does not change its angular position during the machining operation,
   wherein the tilt angle (K) and the angular position are selected such that a predetermined relative rolling motion between the work gear and the tool can be achieved.

2. The machine according to claim 1, wherein the swivel device has a swivel drum capable of rotation about the orientation axis (O), with the first spindle being rotatably mounted on or in said drum.

3. The machine according to claim 2 further comprising rotation means for rotating the swivel drum, said rotation means being configured for at least one of linear rotation and non-linear rotation of the swivel drum.

4. The machine according to claim 2, wherein at least two of the three directions (X, Y, Z) are mutually orthogonal.

5. The machine according to claim 4, wherein the third direction (Z) is inclined with respect to one of the two or to both orthogonal directions.

6. The machine according to claim 2, wherein the tilt angle (K) is at least equal to a maximum value (ΔΓmax) of all machine root angle pivoting ranges occurring during machining of all possible bevel gears on a 6-axis gear machining device that utilizes three translational axes and three rotational axes which are simultaneously controlled during machining.

7. The machine according to claim 6, wherein the angular position of the second spindle is measured against a coordinate axis (Y) which coordinate axis is in the reference plane and is perpendicular to the orientation axis (O), said angular position being designated as the machine root angle (Γ).

8. The machine according to claim 7, wherein a machine root angle (Γ) which is to be adjusted, corresponds to an angle equal to the maximum machine root angle (Γmax) resulting from a bevel gear to be machined on said 6-axis gear machining device, minus the tilt angle (K).

9. The machine according to claim 6, wherein the tilt angle (K) lies within a range of greater than 0° and up to 35°.

10. The machine according to claim 2, wherein the first spindle of the work gear spindle and the tool spindle is rotatably mounted in a first spindle support which is capable of being pivoted about the pivot axis (P) which pivot axis is perpendicular to the reference plane, and which first spindle support is displaceable in one of the three directions, and the second spindle—together with the swivel drum in which it is rotatably mounted—is rotatably mounted in a second spindle support which is displaceable in one of the other two directions, said second spindle being displaceably guided in the third direction.

11. The machine according to claim 10, wherein both spindle supports are guided horizontally.

12. The machine according to claim 10, wherein the first spindle support is guided horizontally and the second spindle support is guided with respect to height.

13. The machine according to claim 11, wherein the second spindle support has a first carriage guided horizontally and a second carriage which is guided on said first carriage with respect to height and on which the swivel drum is rotatably mounted.

14. The machine according to claim 12, wherein the second spindle support has a first carriage guided with respect to height and a second carriage which is horizontally guided on said first carriage and on which the swivel drum is rotatably mounted.

15. The machine according to claim 11, wherein the horizontal guides are each provided on a horizontal machine base.

16. The machine according to claim 12, wherein the horizontal guidance of the first spindle support and the guidance in height of the second spindle support are provided on an inclined or a vertical machine base.

17. The machine according to claim 10, wherein the work gear spindle and the tool spindle are arranged in such a manner that during machining, the work gear and the tool engage at a location substantially above a region of the machine free of horizontal guides, and that a chip collector into which chips will fall substantially by gravity, is or can be provided in said region.

18. The machine according to claim 13, wherein the direction (Z) in which the swivel drum can be moved height-wise with its associated carriage, is inclined against the vertical.

19. The machine according to claim 2, wherein the tool spindle is rotatably mounted in the swivel drum.

20. The machine according to claim 19, wherein a built-in spindle motor for the tool spindle is provided in the swivel drum.

21. The machine according to claim 2, wherein a driving motor for the tool spindle is provided externally of the swivel drum and is connected to the tool spindle via an angular gear.

22. A method for the CNC-controlled machining of spiral bevel gears with and without hypoid offset, comprising the following steps:
- rotatably mounting a work gear by a work gear spindle;
- rotatably mounting a tool by a tool spindle;
- relatively moving of the work gear spindle and of the tool spindle in up to three different directions (X, Y, Z);
- adjusting the work gear spindle or the tool spindle that forms a reference plane with its axis and an orientation axis (O), in its angular position about a pivot axis (P) which pivot axis is perpendicular to the reference plane, corresponding to a bevel gear to be machined on the machine, and maintaining this angular position throughout the machining operation; and
- continuously swiveling the other spindle about the orientation axis (O) at a tilt angle (K) against the orientation axis (O), wherein the tilt angle is non-adjustably fixed for all possible machining operations of said machine;

wherein the angular position and the tilt angle (K) are selected such that a predetermined relative rolling motion between the work gear and the tool is achieved by the continuous swiveling.

23. The method according to claim 22, wherein the tilt angle (K) is selected at least equal to a maximum value ($\Delta\Gamma$max) of all machine root angle pivoting ranges occurring during machining of all possible bevel gears on a 6-axis gear machining device that utilizes three translational axes and three rotational axes which are simultaneously controlled during machining.

24. The method according to claim 23, wherein an angle is calculated for the machine root angle ($\Gamma$) to be adjusted that is equal to the maximum machine root angle ($\Gamma$max) resulting from a bevel gear to be machined on said 6-axis gear machining device, minus the tilt angle (K).

25. The method according to claim 22, wherein to achieve the predetermined rolling motion the continuous swiveling of the other spindle is non-uniform.

* * * * *